Feb. 17, 1948.  E. H. BENSON  2,436,087
COOLING FAN FOR AIRCRAFT ENGINES
Filed Dec. 4, 1944  2 Sheets-Sheet 1
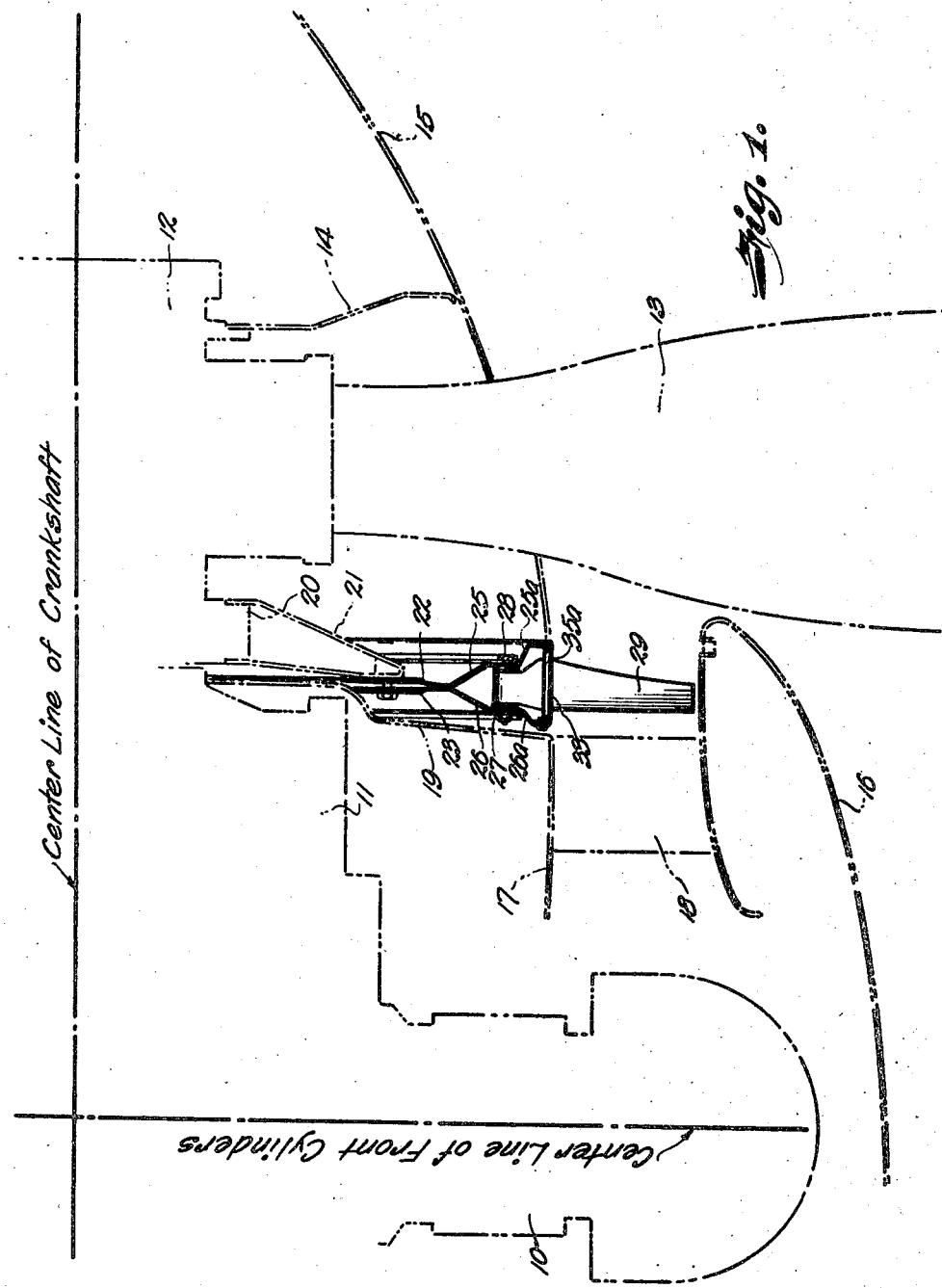
INVENTOR.
Ernest H. Benson
BY
ATTORNEY.

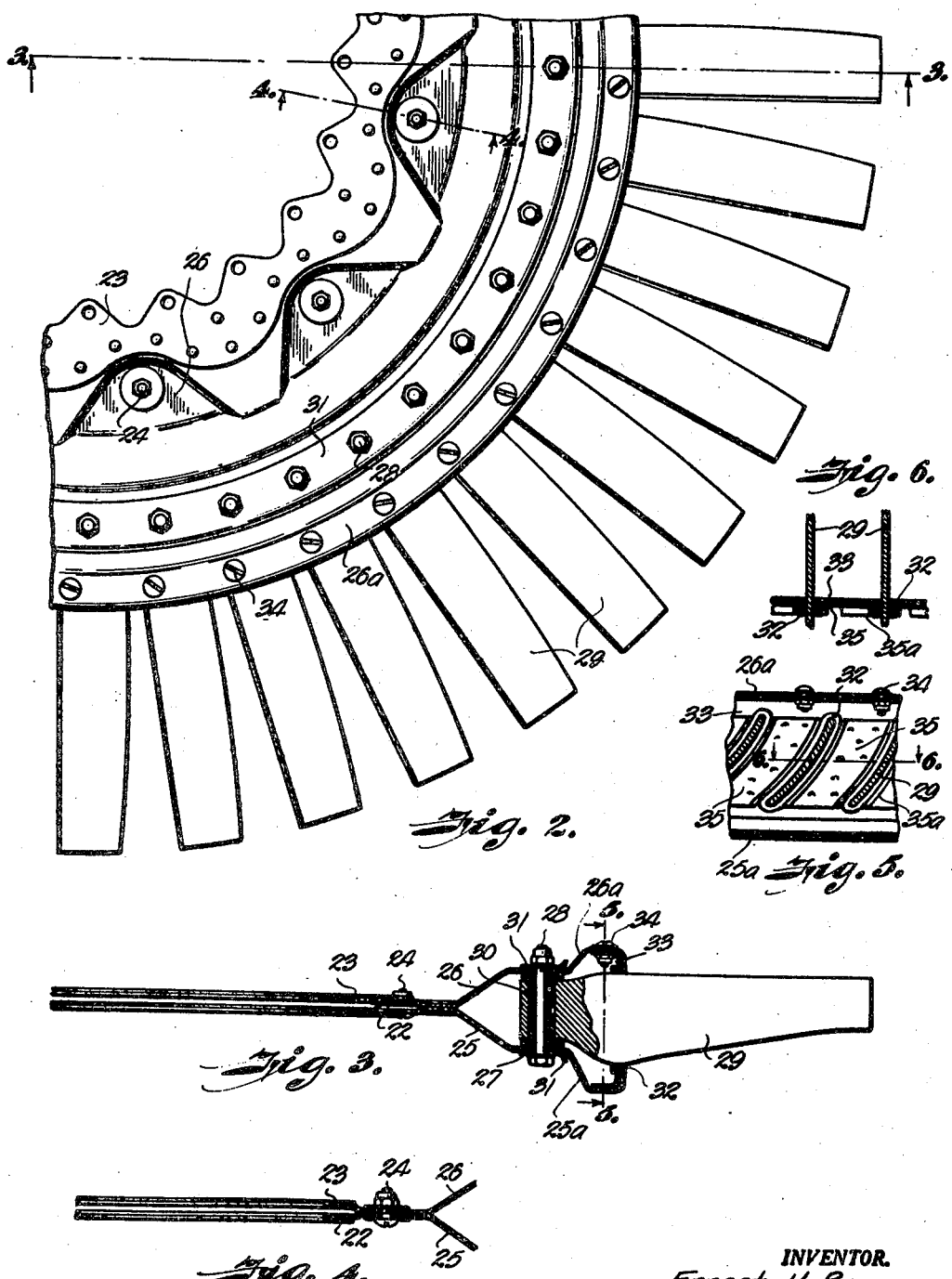

Patented Feb. 17, 1948

2,436,087

UNITED STATES PATENT OFFICE 2,436,087

COOLING FAN FOR AIRCRAFT ENGINES

Ernest H. Benson, Kansas City, Mo.

Application December 4, 1944, Serial No. 566,563

6 Claims. (Cl. 230—120)

This invention relates to fans for circulating cooling air over the exterior of aircraft engines for cooling purposes and, more particularly, to the mounting of the blades for such fans.

As was indicated by Mr. Kenneth Campbell of the Wright Aeronautical Corporation in a paper given at the National Aeronautic meeting in April, 1944, before the Society of Automotive Engineers, the cooling problem, like many other aircraft and engine development problems, imposes a constant limitation on engine and aircraft performance. This is due to the necessity for increased power, and increased weight loading until marginal cooling conditions exist.

Cooling fans comprise but one component of performance improvement to be had with cooling development but offer greater and more immediate returns than are forthcoming from most other factors. Worth-while and, in many cases, very considerable improvement is obtained in the rate of climb, top speed at high altitudes, ceiling, useful load and cruising economy. The variables involved in the use of cooling fans under different conditions including altitude fan efficiency, cowling characteristics and many other factors too numerous to mention. However, assuming marked benefits which are recognized under certain circumstances the fan construction and, particularly, the blade mountings become of importance, principally, because of vibrational difficulty and trouble experienced in balancing fans without careful distribution of weight and the use of special balancing equipment.

It is to this feature of fan blade mounting that the instant invention is directed. The present fan construction provides a simple type of fan blade mounting by which the blades are easily interchangeable and the parts of the fan assembly easily replaced and repaired with standard tools.

The blades are mounted in a resilient substance which has vibration dampening properties. Retention of the blades is by means of an adjustable controllable dampening ring positioned to restrict and offset vibrational tendencies in the blades.

In brief, the fan blade mountings comprise a dampening system including dampened pivots for the individual blades and a dampening ring which supports and acts upon the blades at an intermediate position between the pivoted bases and their free ends or tips to reduce vibrational characteristics.

It is contemplated that the blades will be impregnated with a synthetic to resist abrasion, corrosion and ice formation. Other and further objects of the invention will appear from the following description.

In the accompanying drawings which form a part of the specification and are to be read in conjunction therewith and in which like reference numerals are used to indicate like parts in the various views, Fig. 1 is a side view, partly in section, of a cooling fan assembly showing one embodiment of the invention in which the fan is rotated at propeller speed, Fig. 2 is an enlarged front elevational view of a portion of the fan shown in Fig. 1, Fig. 3 is a view taken along the line 3—3 in Fig. 2 in the direction of the arrows, Fig. 4 is a view taken along the line 4—4 in Fig. 2 in the direction of the arrows, Fig. 5 is a view taken along the line 5—5 in Fig. 3 in the direction of the arrows, and Fig. 6 is a view taken along the line 6—6 in Fig. 5 in the direction of the arrows.

Referring to Fig. 1 of the drawings, at 10 is shown diagrammatically the cylinders of a radial engine mounted upon a crankcase 11 and enclosed within the engine nacelle. On the forward end of the crank shaft is mounted a propeller hub 12 from which extend the propeller blades 13. Attached to the propeller hub in front of the blades, by means of bulkheads 14, is a spinner 15. The cowling which streamlines the frontal engine surface and nacelle consists of an outer skin 16 and an inner skin 17. Between the inner and outer skins of the cowling is an annular passageway or air inlet port through which the cooling air is admitted. In this passageway are the stationary vanes 18. A support for the inner skin is shown diagrammatically in the form of a cowling bulkhead 19. The supports for the outer skin, other than the vanes 18, are omitted from the drawing in the interest of simplicity, since they are conventional and form no part of the present invention.

Upon a hub flange 20, immediately behind the blades, is an annular extension member 21 of the hub flange which carries the fan assembly. Bolted to member 21 are front and rear reinforcing plates 22 and 23. Between the outer edges of these two plates is clamped, and held rigidly in position by bolts 24, a front bulkhead 25 and a rear bulkhead 26. The reinforcing plates 22 and 23, with the front and rear bulkheads 25 and 26 bolted therebetween, constitutes the fan blade support. The outer extremities of these bulkheads are spread to accommodate the insertion of the blade pivot bushings 27 spaced at regular intervals, adjacent the outer edge of the blade support, and held in place by bolts 28. The inner extremities of the fan blades 29 have cylindrical holes therethrough for pivoting the blades upon the bushings. Between the bushings 27 and the holes in the ends of the blades are rubber inserts 30 which effect a cushioning action between the blades and the blade supporting bulkheads. To stiffen the bulkheads or blade support, adjacent the ends of the bolts, are reinforcement angles 31 which provide a more rigid joint at the cushioned pivot. Surrounding the blades, between their pivots and the tip ends, are resilient bands 32 formed, preferably, of rubber or synthetic rubber and bonded integrally with the blade surfaces. The positioning of these resilient bands is determined by the vibration frequency characteristics of each particular type fan blade and, through a supplementary support located at these bands, vibrational tendencies of the blades are dampened and to a great extent eliminated.

In a fan assembly of this type, wherein the blade-dampening system is composed of dampened blade pivots and a dampening ring intermediate the blade ends, the frequency of the fan blade may be rather accurately calculated by the following formula:

$$Z = 2 \frac{L}{s} \frac{P}{Rkg}$$

Where:

$Z$ = the natural vibrational frequency.
$P = W + F$ (W weight of blade plus F aerodynamic load).
$k$ = spring constant of dampening ring.
$L$ = blade length.
$g$ = gravity acceleration.
$s$ = distance from pivot to dampening ring.
$R$ = constant determined from blade shape from aerodynamic load F.

This information as to the vibrational characteristics of the blades is useful in designing and determining the dampening characteristics of the system.

Flanges are formed at the outer edges of the front and rear bulkheads by bending the edges toward the blades so their edges are in close proximity with the leading and trailing edges of the blades. Held in position between the flanges is a shield ring 33, spot welded to the front bulkhead 25a and attached to the rear bulkhead 26a by screw bolts 34. Slots in the shield ring, conforming substantially with the cross section and curvature of the blades, permit passage of the blades therethrough. Between the blades and within the shield ring 33 are a plurality of flanged trough-shaped blade brackets 35, spot welded or otherwise fastened to the shield ring. The flanged edges 35a of the brackets abut against the resilient rings 32 serving to support and dampen vibration of the blades at an intermediate point. The blade pivots and supplementary support or shield ring are cushioned and dampened at both points.

It will be appreciated that the construction shown is but a single embodiment of a fan assembly which incorporates the idea of supporting the blade at its base and at an intermediate point by cushioned mountings. Where the fan is geared to rotate at a speed different than the propeller shaft speed it may be necessary to alter the construction to accommodate it to the different type drive. In any event, the basic principle of cushioning the fan blades, where they are pivoted to the blade support and at a second location between the pivots and the ends of the blades, to further dampen vibrational tendencies of the blades constitutes the inventive concept. This effect may be obtained by many different types of construction. It is of importance also that the blade mountings be such that they can be easily assembled and disassembled for replacement, repair or adjustment with standard tools, such as a wrench and screw driver. Besides providing a fan assembly which is easily balanced and serviced, the mounting is silent, as the fan support members are heavily cushioned in resilient material.

It is contemplated that the cushioning inserts 30 may be dispensed with in some cases since a considerable degree of cushioning and dampening of the blades may be accomplished by pivoting the blades in metal mountings and using abrasion strips at the intermediate support ring.

From the foregoing, it will be seen that the invention is well adapted to attain the ends and objects hereinbefore set forth together with other advantages which are obvious and which are inherent to the structure.

It will be understood that certain features and subcombinations are of utility and may be employed without reference to other features and subcombinations. This is contemplated by and within the scope of the claims.

As many possible embodiments may be made of the invention without departing from the scope thereof it is to be understood that all matter herein set forth or shown in the drawings is to be interpreted as illustrative and not in a limiting sense.

Having thus described my invention, I claim:

1. In a fan assembly for cooling aircraft engines adapted to be positioned in the air inlet port of an engine nacelle and driven from the propeller shaft the improvement comprising a blade support member, a plurality of fan blades pivoted adjacent their inner extremities in the blade support, a supplementary dampening support for said fan blades positioned intermediate their pivots and outer extremities including reinforcement flanges carried by the blade support and support members between the flanges for the individual blades.

2. A fan assembly as in claim 1 wherein the pivots and supplementary dampening support for the blades are cushioned with a resilient substance where they contact the fan blades.

3. A fan assembly as in claim 1 wherein the supplementary dampening support for the fan blades comprises flanges on opposite sides of the blades carried by the blade support and a shield ring mounted between the flanges apertured to receive the blades and supporting the blades intermediate their pivots and outer extremities to dampen vibrational disturbances.

4. A fan assembly as in claim 1 in which the supplementary dampening support comprises reinforcement flanges on opposite sides of the blade and carried by the blade support a shield ring apertured to receive the blades and support them intermediate their pivots and outer extremities, resilient cushions between the apertured shield ring and blades.

5. In a fan assembly for cooling aircraft engines adapted to be positioned in the air inlet port of an engine nacelle and driven from the propeller shaft the improvement comprising a blade support member, a plurality of fan blades pivoted adjacent their inner extremities on the blade support, a supplemental dampening support including reinforcement flanges on opposite sides of the blade affixed to the blade support a shield ring apertured to receive the blades between the reinforcement flanges and supporting the blades intermediate their pivots and outer extremities, resilient cushioning members at the pivots and between the supplemental support and the blades.

6. A fan assembly as in claim 5 in which the supplemental support includes besides the reinforcement flanges and shield ring, flanged blade brackets within the ring and between the blades abutting said resilient cushioning members.

ERNEST H. BENSON.

REFERENCES CITED

The following references are of record in the file of this patent:

UNITED STATES PATENTS

| Number | Name | Date |
|---|---|---|
| 2,130,145 | McKee | Sept. 13, 1938 |
| 2,144,428 | Martin | Jan. 17, 1939 |
| 2,147,005 | Williams | Feb. 14, 1939 |
| 2,335,734 | Caldwell | Nov. 30, 1943 |
| 2,354,101 | Broders | July 18, 1944 |